United States Patent [19]
Haberl et al.

[11] Patent Number: 6,053,559
[45] Date of Patent: Apr. 25, 2000

[54] ARRANGEMENT FOR ATTACHMENT OF A TOP STORAGE WELL COVER

[75] Inventors: Franz Haberl, Wallerfing; Theodor Striegl, Gangkofen, both of Germany

[73] Assignee: EDSCHA Cabrio-Verdecksysteme GmbH, Hengersberg, Germany

[21] Appl. No.: 09/225,181

[22] Filed: Jan. 4, 1999

[30] Foreign Application Priority Data

Jan. 5, 1998 [DE] Germany ............................ 198 00 156

[51] Int. Cl.[7] ........................................ B60J 7/12
[52] U.S. Cl. ...................... 296/107.09; 296/121; 296/122
[58] Field of Search ............................... 296/107.09, 121, 296/122

[56] References Cited

U.S. PATENT DOCUMENTS

| | | | |
|---|---|---|---|
| 4,553,784 | 11/1985 | Trenkler | 296/122 |
| 4,929,015 | 5/1990 | Bauer | 296/121 |
| 5,620,226 | 4/1997 | Sautter | 296/107.09 |
| 5,645,309 | 7/1997 | Graf | 296/121 |
| 5,829,821 | 11/1998 | Aydt et al. | 296/122 |

*Primary Examiner*—Gary C. Hoge
*Attorney, Agent, or Firm*—Brown & Wood, LLP

[57] ABSTRACT

An arrangement for attaching a top storage well cover to a motor vehicle body for a pivotal movement about an axis arranged in the region of a rear edge of a top storage well opening between closed and open positions, with the arrangement including two articulated devices spaced from each other in a direction transverse to a longitudinal extent of the vehicle and each including two articulated arms, which form an articulated lever parallelogram, support axles for pivotally attaching the two articulated arms to the storage well cover and to the vehicle body, and a linkage for displacement of one of support axles of at least one arm during the pivotal movement of the cover.

9 Claims, 4 Drawing Sheets

ARRANGEMENT FOR ATTACHMENT OF A TOP STORAGE WELL COVER

BACKGROUND OF THE INVENTION

1. Field of the Invention

The present invention relates to an arrangement for attaching a top storage well cover to a motor vehicle body for a pivotal movement about an axis arranged in a region of a rear edge of a top storage well opening from a closed position, in which the cover closes the storage well opening, to an open position in which the cover provides for a complete access to the storage well opening, with the arrangement including two articulated devices spaced from each other in a direction transverse to a longitudinal extent of the vehicle and each including at least one articulated arm pivotally attached at opposite ends thereof to the top storage well cover and the vehicle body.

2. Description of the Prior Art

Generally, the covers for top storage wells, which are provided in motor vehicles with a collapsible top, are attached to walls of the storage wells or adjacent parts of motor vehicle bodies with simple articulated attachment elements. Conventional attachment elements, which find at present wide use for attaching of a top storage well cover in a motor vehicle with a collapsible top, include a pair of U-shaped arcuate articulated arms with which the cover is attached to a rear wall of the top storage well. The cover is so attached to the rear wall of the storage well that the cover pivots from a closed position, in which it is flush with the vehicle body profile, into an open, at least approximately vertical position. In motor vehicles with collapsible tops with rigid rear windows and with top storage well having relatively small or insufficient dimensions, a relatively large pivoting area is required for the necessary pivotal movement of the cloth tension bracket and the rear window when the top storage well cover is conventionally pivots about the rear edge of the storage well. Under unfavorable conditions, for opening the top storage well cover, a swing-up of the cloth tension bracket in a approximately perpendicular positions is necessary. With top storage well covers equipped with rigid rear windows having a relatively large surface, there exists a danger that the rear window, upon opening of the cover, would reach into the head area of a passenger occupying the rear seat of the vehicle. This is at least highly undesirable, as it makes necessary for the passenger to get out of the vehicle when the cover is being open. Furthermore, with the conventional attachment of a top storage well cover with U-shaped articulated arms, the displacement of the top into the top storage well, with already slightly lifted cloth tension bracket and the rear window which, thus, permit partial opening of the cover, is not possible or at least not possible without incurring relatively high assembly costs.

Accordingly, an object of the present invention is to provide an arrangement for attaching a top storage well cover for a motor vehicle with a collapsible top which would insure opening of the top storage well and a free access thereto already with a small lifting angle of the cloth tension bracket.

Another object of the present invention is to provide an arrangement of the above-described type having reduced manufacturing and assembly costs.

SUMMARY OF THE INVENTION

These and other objects of the present invention, which will become apparent hereinafter, are achieved by providing an arrangement including two articulated devices spaced from each other in a direction transverse to the longitudinal extent of the vehicle and each including two articulated arms, which form an articulated lever parallelogram, support axles for pivotally attaching the two articulated arms to the storage well cover and to the vehicle body and means for displacing of one of support axles of at least one of the two arms during the pivotal movement of the storage well cover between its closed and open positions.

Providing an attaching arrangement with articulated devices having each two articulated arms, which form an articulated lever parallelogram, permits to effect displacement of the top storage well cover at which the cover moves, upon increased lifting of its rear end, in a first, forward tilted partially open position, with an increasing clearance between the cover and the rear edge of the top storage well, and then, in a course of its rearward displacement with a simultaneous lowering of the rear end, in a raised open position with an increased lifting of the cover front end. This permits to bring the top storage well cover into its fully opening position, which insures the displacement of the top into the storage well, already with a slightly lifted cloth tension bracket and with the rigid rear window being only slightly tilted forward. As a result, the cloth tension bracket need only be slightly lifted for opening of the vehicle top, with accompanying reduction in time necessary for opening of the vehicle top.

In accordance with an advantageous embodiment of the present invention, the displaceable support axle of the one of articulated arms is associated with the vehicle body, and the displacement means includes a positive control element for forcing an upward displacement of the displaceable axle in accordance with the pivotal movement of the storage well cover.

The control element can have different forms. E.g., the control element can be formed as a crank guide. However, the control element can be produced with particularly small expenses when it is formed of three links having different lengths and arranged one beneath the other. Preferably, the linkage, which forms the control element, includes a support link, a control link, and a link connecting the support and control links. The support and control links and attached to the vehicle body for pivotal movements about respective axles located in a common plane. The axle of the control link is arranged coaxially with the support axle of another of the two arms.

In order to provide for a vertical displacement of the displaceable axle, which is reversible during the process of opening of the top storage well cover, advantageously, the axles of the control and support links are spaced from each other a distance corresponding to a distance between an axle connecting the connecting link with the support link and the axle which connects the support link to the vehicle body.

The length of the control link is so selected that it is equal to or is smaller than the half of the distance between the axles, with which it is attached to the vehicle body, and the axle with which the support link is attached to the vehicle body. The foregoing parameters insure a pivotal movement of the control link about an angle of more than 90° and thereby an appropriate tilting angle of the top storage well cover upon pivoting of the cover about a corresponding pivot angle. In addition, providing of links having different lengths permits to so select the length of the arm, which controls the cover opening, that a practically unlimited range of the tilting movement of the top storage well cover, during the course of the cover opening movement, is achieved.

According to a further embodiment of the inventive attaching arrangement, the displaceable support axle of the articulated arm, which control the opening of the cover is secured to the support link at a distance from the axle with which the connecting link is attached to the support link.

To provide for a most possible free access to the opening of the top storage well, the articulated arms of both articulated devices have, in regions adjacent to attachment points of the articulated arms with the vehicle body, respective U-shaped elbow sections, with the elbow sections of the two arm of each articulated device being arranged one after another in the longitudinal direction of the vehicle.

An important feature of the present invention consists in that one of two arms of each articulated device, which pivots about stationary axles provided, respectively, on the cover and the vehicle body, supports the cover when the cover is moved from its closed position into its open position, and another of the two arms of each articulated device forms a drive link for controlling an opening movement of the top storage well cover.

BRIEF DESCRIPTION OF THE DRAWINGS

The features and objects of the present invention will become more apparent, and the invention itself will be the best understood from the following detailed description for the preferred embodiment when read with reference to the accompanying drawings, wherein.

DETAILED DESCRIPTION OF THE PREFERRED EMBODIMENT

Figure 1:
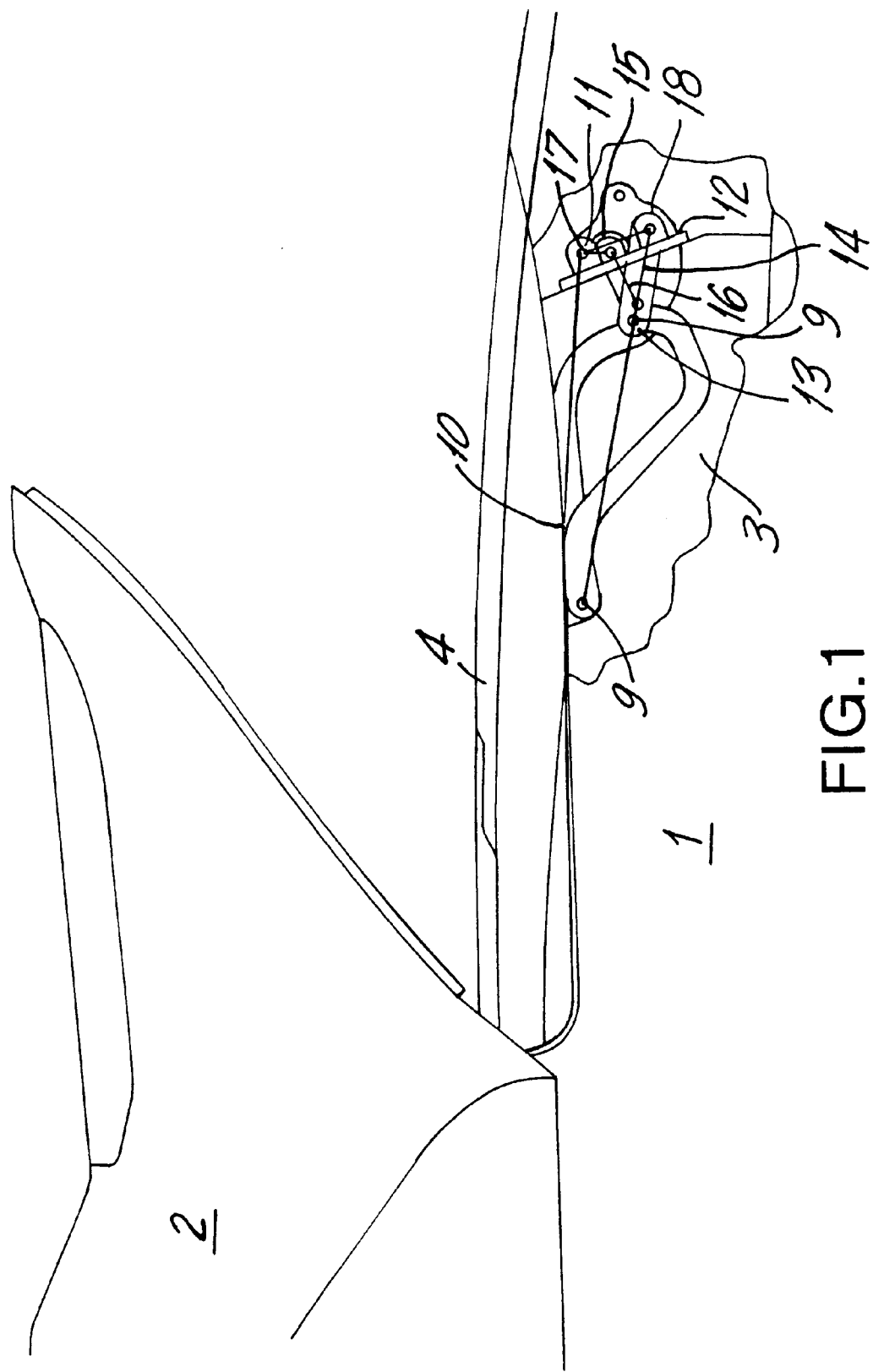
FIG. 1 shows a side cut-out view of a motor vehicle body having a collapsible top with a top storage well cover in its closed position.

Generally, a motor vehicle body 1, not shown in detail, of a convertible motor vehicle, is equipped with a collapsible top 2, likewise not shown in detail, a top storage well 3, and a top storage well cover 4. The top storage well cover 4 is attached to the motor vehicle body 1 with two articulated devices according to the present invention. The two articulated devices 5 are spaced from each other in a direction transverse to the longitudinal direction of the motor vehicle. Each articulated device 5 includes two articulated arms 6 and 7 which form an articulated lever parallelogram. Both articulated arms 6 and 7 are attached to the storage well cover 4 with a common bearing or support member 8 for pivotal movement about axles 9 and 10, respectively. One of the two articulated arms 6, 7, namely, the arm 6 is attached to a bearing member 12 provided on the vehicle body 1 for pivoting about a stationary axle 11. The articulated arm 6 forms a support element for the storage well cover 4 when the storage well cover 4 is not in its closed position. The other articulated arm 7 is attached to the vehicle body by a displaceable support or attachment axle 13. The means for displacing the support axle 13 of the articulated arm 7 of the articulated lever parallelogram 5 forms a positive control element which forces vertical displacement of the cover in accordance with the pivotal movement of the storage well 4.

In the embodiment shown in the drawings, the control element for displacing the axle 13 is formed by a linkage consisting of three links arranged one beneath the other and having different lengths. The linkage includes a support link 14, a control link 15, and a connecting link 16. The support link 14 and the control link 15 are attached to the vehicle body 1 for pivotal movement about support axles 17 and 18 which are arranged in a common plane. The support axle 17 of the control link 15 is coaxial with the axle 11 of the articulated arm 6. The distance between the axles 17 and 18, secured in the vehicle body 1, corresponds, in the embodiment shown in the drawings, to the distance between the support axle 19 of the connecting link 16 and the support axle 18 of the support link 14. The length of the control link 15 corresponds, in the embodiment shown in the drawings, to a half of the distance between the support axles 17 and 18. As a result of the selected relationships, the control link 15 is pivotable about an angle of more than 90°, with the pivot angle of the storage well cover 4 being equal, as result, to about 90°. The articulated arm 7 is attached to the free end of the support link 14 at a distance from the support axle 19 of the connecting link 14. As further shown in the drawings, the two articulated arms 6 and 7 have, in their regions adjacent to their respective axles 11 and 13, respective elbow sections 21 and 20 having a U-shaped profile. The U-shaped profiles of the elbow sections 21 and 20 of the articulated arms 6 and 7 have different configurations and are arranged one after another in the longitudinal direction of the vehicle.

Figure 2:
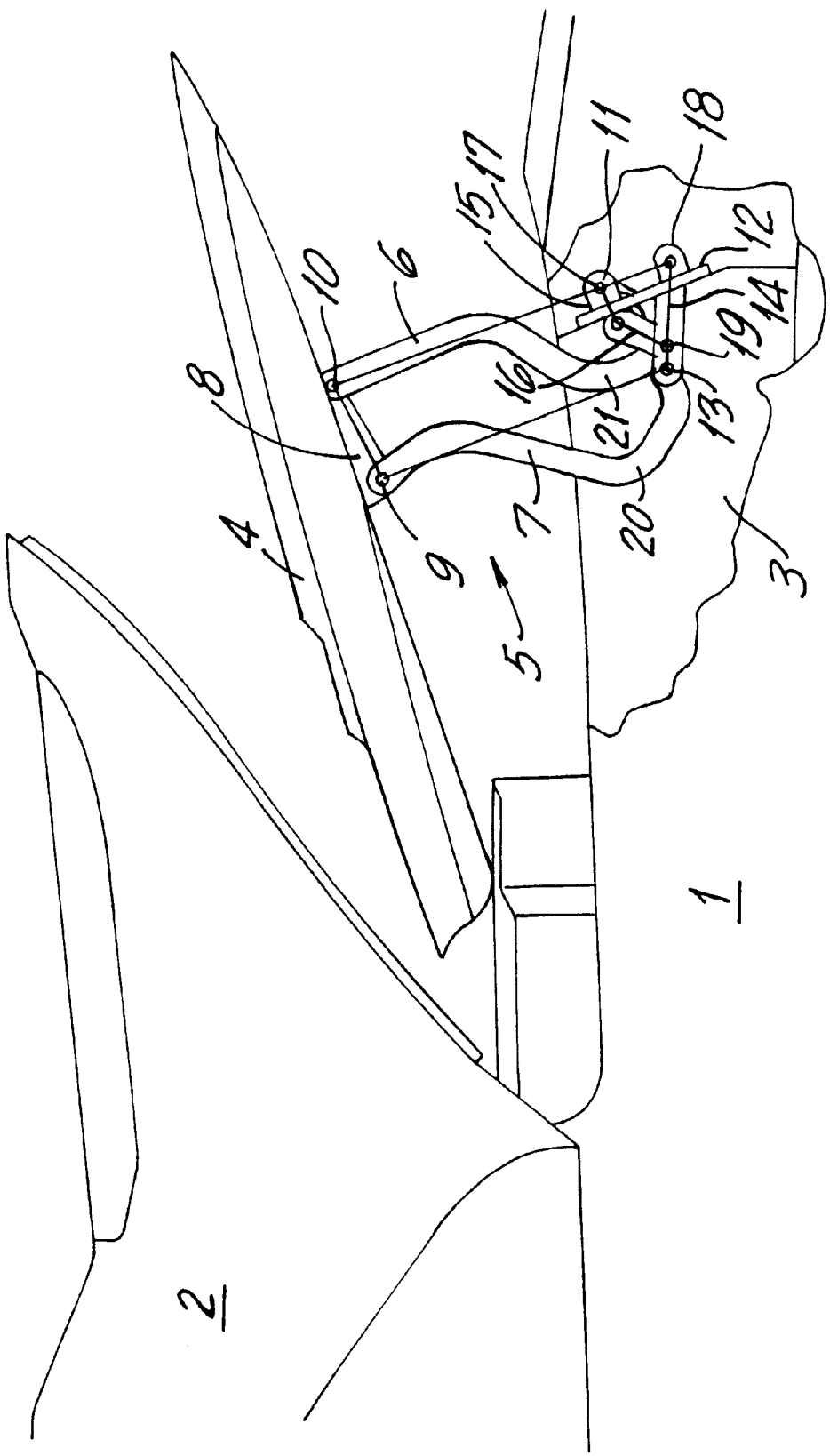
FIG. 2 shows a side cut-out view of a motor vehicle body having a collapsible top with a top storage well cover in its partially open position.
Figure 3:
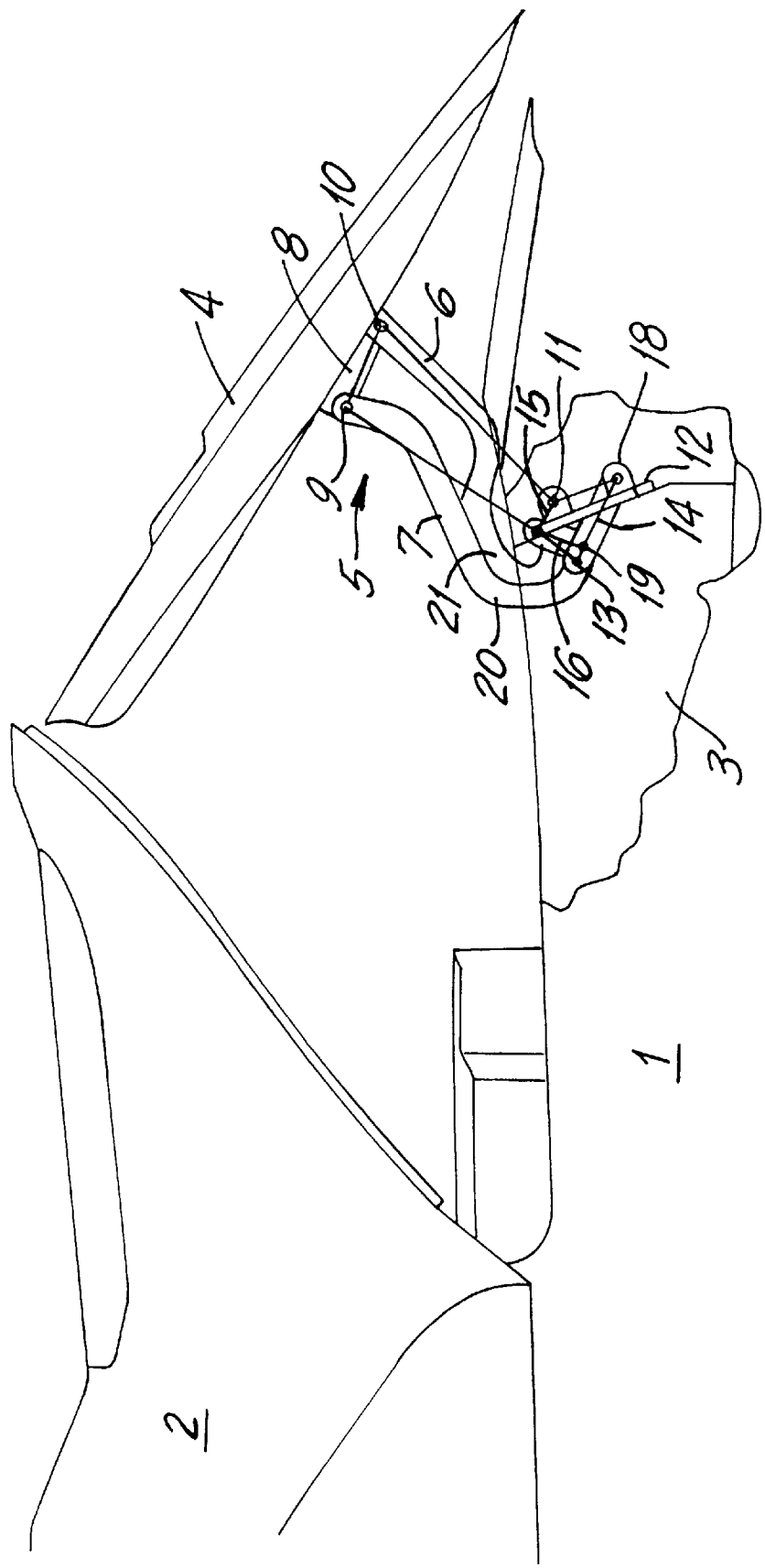
FIG. 3 shows a side cut-out view of a motor vehicle body having a collapsible top with a top storage well cover in its completely open position.
Figure 4:
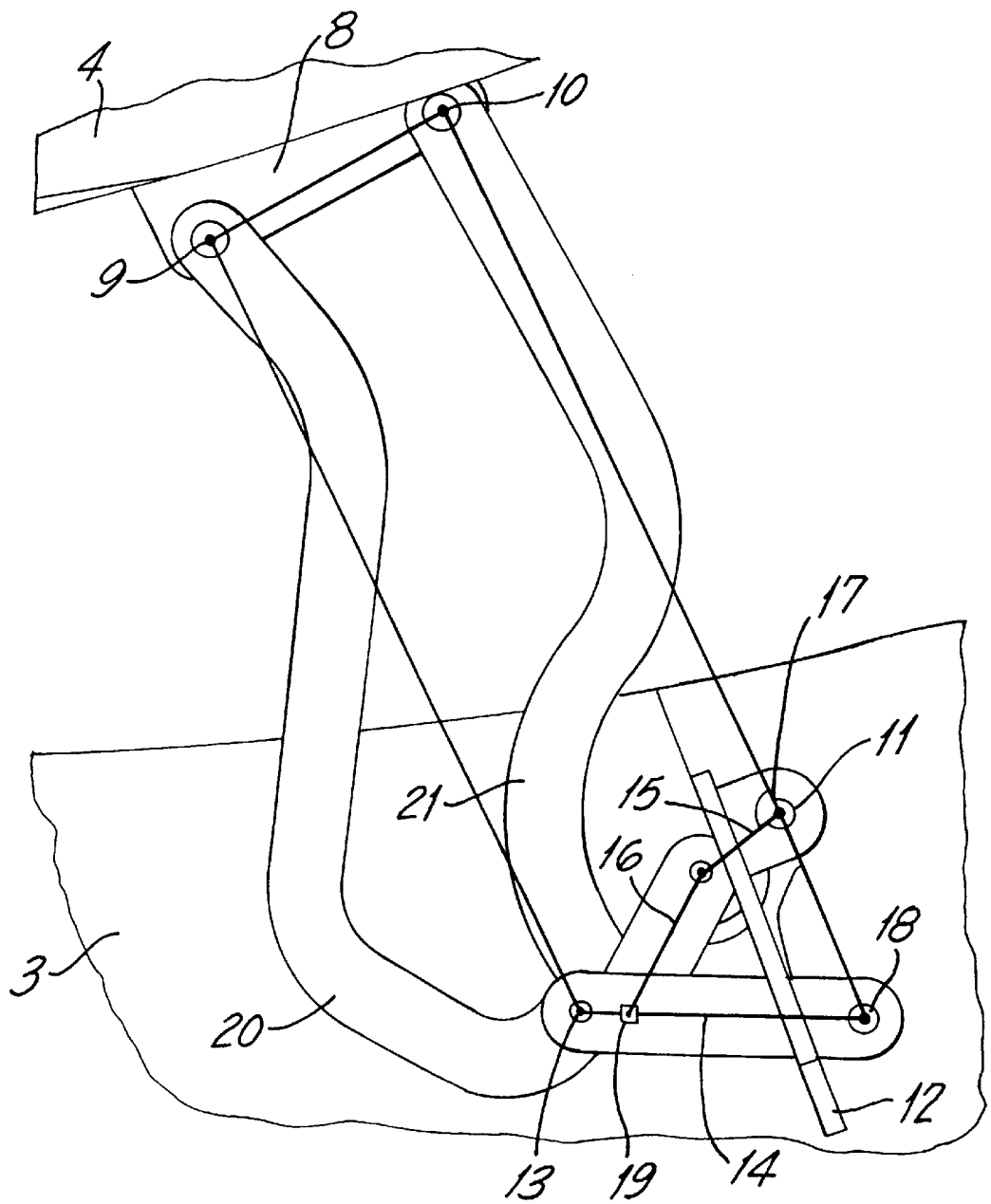
FIG. 4 shows a detail of the side view shown in FIG. 2 at an increased sealed.

As shown in FIG. 1, in the closed position of the top storage well cover 4, the support link 14 is in a slightly upward-lifted position, and the control link is is in a substantially vertical downward directed position. Upon displacement of the storage well cover 4 from its closed position to the open position, the control link 15 moves about its support axle 17 forward and upward, with the support link 14 being pivoted by the connecting link 16 downward about the support axle 18. As a result of the downward displacement of the support link 14, the storage well cover 4, which continuous its upward movement, is tilted downward by the articulated arm 7 about the axle 10 of the articulated arm 6. As a result of this tilted movement of the storage well cover, in its partially open position shown in FIG. 2, the front end of the cover is lowered downwardly. During further opening movement, the control link 15 moves further forward and upward and imparts, to the support link 14 via the connecting link 16, an upwardly directed movement. As a result of the link movement, the storage well cover 4 is tilted by the articulated arm 7 about the axle 10 of the articulated arm 6 rearward, with the cover front edge being lifted of the storage well opening, providing a free access thereto which enables the displacement of the top 2 into the storage well 3. During closing of the cover, the above-described movement of the cover 4 and the linkage takes place in a reverse direction and order.

Though the present invention was shown and described with references to the preferred embodiments, various modifications thereof will be apparent to those skilled in the art and, therefore, it is not intended that the invention be limited to the disclosed embodiment or details thereof, and departure can be made therefrom within the spirit and scope of the appended claims.

What is claimed is:

1. An arrangement for attaching a top storage well cover to a motor vehicle body for a pivotal movement about an axis arranged in a region of a rear edge of a top storage well opening from a closed position, in which the cover closes the storage well opening, to an open position in which the cover provides for a complete access to the storage well opening, the arrangement comprising two articulated devices spaced from each other in a direction transverse to a longitudinal extent of the vehicle and each including two articulated arms, which form an articulated lever parallelogram, support axles for pivotally attaching the two articulated arms to the storage well cover and to the vehicle body, and means for displacement of one of support axles of at least one of the two arms during the pivotal movement of the storage well cover between the closed and open positions thereof.

2. An arrangement as set forth in claim 1, wherein the one of the support axles of at least one of the articulated arms is associated with the vehicle body.

3. An arrangement as set forth in claim 1, wherein the displacement means comprises a positive control element for forcing an upward displacement of the one of support axles in accordance with the pivotal movement of the storage well cover.

4. An arrangement as set froth in claim 3, wherein the positive control element comprises a linkage including a support link, a control link, and a link connecting the support and control links, wherein the support and control links are attached to the vehicle body for pivotal movements about respective axles located in a common plane, and wherein the axle of the control link is arranged coaxially with the support axle of another of the two arms.

5. An arrangement as set forth in claim 3, wherein the positive control element comprises a linkage consisting of three links arranged one below another and having different lengths.

6. An arrangement as set forth in claim 4, wherein the axles of the control and support links are spaced from each other a distance corresponding to a distance between an axle connecting the connecting link with the support link and the axle which connects the support link to the vehicle body.

7. An arrangement as set forth in claim 6, wherein the one of the support axles of the at least one of the two arms is secured to the support link at a distance from the axle with which the connecting link is attached to the support link.

8. An arrangement as set forth in claim 1, wherein the articulated arms of both articulated devices have, in regions adjacent to attachment points of the articulated arms with the vehicle body, respective U-shaped elbow sections, with the elbow sections of the two arm of each articulated device being arranged one after another in the longitudinal direction of the vehicle.

9. An arrangement as set forth in claim 1, wherein one of the two arms of each articulated device, which pivots about stationary axles provided on the cover and the vehicle body, supports the cover when the cover is moved from the closed position thereof, and another of the two arms of each articulated device forms a drive link for controlling an opening movement of the top storage well cover.

* * * * *